US005504925A

United States Patent [19]
Jeffs

[11] Patent Number: 5,504,925
[45] Date of Patent: Apr. 2, 1996

[54] APPARATUS AND METHOD FOR IMPLEMENTING INTERRUPTS IN PIPELINED PROCESSORS

[75] Inventor: Paul V. Jeffs, Sunnyvale, Calif.

[73] Assignee: Intergraph Corporation, Huntsville, Ala.

[21] Appl. No.: 348,786

[22] Filed: Dec. 2, 1994

Related U.S. Application Data

[63] Continuation of Ser. No. 947,215, Sep. 18, 1992, abandoned.

[51] Int. Cl.$^6$ .................... G06F 9/26; G06F 9/34; G06F 9/345; G06F 9/38
[52] U.S. Cl. .................. 395/800; 364/230.2; 364/230.5; 364/231.8; 364/242.2; 364/242.33; 364/243.43; 364/246.5; 364/247.7; 364/246.92; 364/254.5; 364/256.8; 364/262.9; 364/DIG. 1; 364/DIG. 2; 364/268.1
[58] Field of Search ...................... 395/800, 375, 395/452, 497.04, 775, 650, 421.02, 476; 364/736, 750.5, DIG. 1, DIG. 2, 786, 748

[56] References Cited

U.S. PATENT DOCUMENTS

| | | | |
|---|---|---|---|
| 4,285,035 | 8/1981 | Kindell et al. | 395/375 |
| 4,484,259 | 9/1984 | Palmer et al. | 364/754 |
| 4,760,519 | 7/1988 | Papworth et al. | 395/375 |
| 5,072,364 | 12/1991 | Jardine et al. | 395/375 |
| 5,201,057 | 4/1993 | Uht | 395/80 D |

OTHER PUBLICATIONS

Smith, J. E. and Pleszskun, A. R., "Implementing Precise Interrupts in Pipelined Processors," *IEEE Transaction on Computers*, May 1988, vol. 37, No. 5, pp. 562–573.
Johnson, W. M., "Super–Scalar Processor Design," Computer Systems Laboratory, Stanford University, Jun. 1989, Technical Report No. CSL–TR–89–383.

*Primary Examiner*—Daniel H. Pan
*Attorney, Agent, or Firm*—Townsend and Townsend and Crew

[57] ABSTRACT

In a computing system of the type which executes instructions having the form A op B=B, a floating point register includes a plurality of addressable storage elements for storing operand data. A first address receiving circuit receives the B operand address from a first instruction, and a second address receiving circuit receives the A operand address from the first instruction. The A and B operand addresses are each used for addressing one of the plurality of floating point register storage elements. An instruction executing circuit performs a function designated by the first instruction on the operand data output from the floating point register and generates result data. The instruction executing circuit includes an exception circuit for generating exception data indicating whether an exception occurred when the function was performed. A shift register has a plurality of storage elements for storing address and control information. A first address storing circuit stores the B operand address in a selected one of the plurality of shift register storage elements, and a shift register output circuit outputs the stored first instruction B operand address at approximately the time the result data corresponding to the first instruction is generated by the instruction executing circuit. A floating point register storage control circuit stores the result data corresponding to the first instruction in the floating point register storage element addressed by the stored first instruction B operand address as long as no exception occurred when the function was performed. However, the floating point register storage control circuit inhibits the storage of the result data in the floating point register when an exception does occur so that the old B operand value is not destroyed by a probably erroneous value. An operand queue includes a plurality of storage elements for storing A operand data output by the floating point register, and a trap queue includes a plurality of storage elements for storing A operand data corresponding to an instruction which generated exception data, and A trap queue data storing circuit stores the A operand data output from the operand queue into one of the trap queue storage elements whenever an exception is detected. The instructions which were executing when the first exception is detected are allowed to complete.

25 Claims, 1 Drawing Sheet

APPARATUS AND METHOD FOR IMPLEMENTING INTERRUPTS IN PIPELINED PROCESSORS

This is a Continuation of application Ser. No 07/947,215 filed Sep. 18, 1992, now abandoned.

BACKGROUND OF THE INVENTION

Traditional computer architectures were based on a sequential model of program execution wherein instructions issued and executed sequentially. That is, each instruction finished before the next instruction started. Error recovery pursuant to this model is very easy because the process state (e.g., the program counter, the general purpose registers, and main memory) which exists when an interrupt condition is detected is predetermined and consistent with the last instruction to successfully execute. Consequently, the process may be restarted by executing the program instruction which directly follows the last instruction to successfully execute.

As technology advanced, pipelined processors were constructed wherein several instructions could be in some phase of execution at the same time. Unfortunately, pipelined instructions may modify the process state in an order different from that defined by the sequential architectural model. Thus, when an interrupt condition is detected, the process state usually does not correspond to the state that would exist if all instructions executed sequentially. That makes restarting the process very difficult, if not impossible.

Techniques for implementing interrupts in pipelined processors are disclosed in "Implementing Precise Interrupts In Pipelined Processors," by James E. Smith, et al., IEEE Transactions on Computers, Volume 37, No. 5, May, 1988, pages 562–573, incorporated herein by reference. In one method disclosed therein (the result shift register method), an instruction can modify the process state only when all previously issued instructions are known to be free of exception conditions. To accomplish this, an N-stage result shift register is used to control instruction execution, where N represents the maximum number of clock periods that an instruction may require to complete. An instruction that takes i clock periods to execute places control information in stage i of the result shift register at the time it issues. During each clock period, the control information is shifted down one stage towards stage one. When the control information reaches stage one, it is used during the next clock period to control the hardware so that the result data generated by the instruction is stored at that time in the correct result register.

To insure that the instructions modify the process state in order, the control information for an instruction must not be placed in stage i of the result shift register when the control information for a previously issued instruction is in stage j (j being greater than i). Thus, an issuing instruction that places control information in stage j reserves all lesser numbered stages. A subsequent instruction which designates a reserved stage must wait at the issue stage until the designated stage is no longer reserved.

The primary disadvantage of this method is that fast instructions may sometimes get held up at the issue register even if they are independent of the other instructions and could otherwise issue. In addition, the held instructions block the issue register when slower instructions behind them could presumably issue.

Another disclosed method (the reorder buffer method) overcomes the foregoing disadvantages by allowing instructions to finish out of order, but a special circular buffer, termed a reorder buffer, is used in addition to a result shift register to reorder the instructions before they modify the process state. Every time an instruction issues, control information is loaded in the next sequential reorder buffer stage which includes a space reserved for the result data generated by the instruction. The reorder buffer entries thus preserve the issue sequence. A tag is placed in the appropriate result shift register stage to identify the reorder buffer entry corresponding to the instruction.

When an instruction completes, both the result data and any exception conditions are stored in the reorder buffer. When the entry at the head of the reorder buffer contains valid results (its corresponding instruction has completed), then the exception data is checked. If no exception conditions are detected, the result data is written into the registers. If an exception is detected, instruction issuing stops, and all further writes into the register file are inhibited.

While this method is an improvement over the result shift register method, it still suffers a performance penalty. For example, a computed result that is generated out of order is held in the reorder buffer until previous instructions, finishing later, have updated the register file, even if the instructions are independent. Furthermore, an instruction dependent on a result being held in the reorder buffer cannot issue until the result has been written into the register file.

A third disclosed method (the history buffer method) attempts to overcome the disadvantages of both the result shift register method and the reorder buffer method. With this method, computed results are placed in a working register file, but enough state information is stored in a history buffer so that a precise state can be restored if an exception occurs. The history buffer is organized and functions in a manner very similar to the reorder buffer. When an instruction issues, a history buffer entry is loaded with control information, and the current value of the destination register (to be overwritten by the issuing instruction) is also read from the register file and written into the buffer entry. The result data generated by the instruction are written directly into the register file when an instruction completes. Exception data are written into the history buffer. When the history buffer contains an entry at the head that is known to have finished without exceptions, the history buffer entry is no longer needed and that buffer location can be reused.

When an exception condition is detected at the head entry of the buffer, the buffer is held, instruction issue is immediately halted, and the instructions in the pipeline are canceled. The active buffer entries are then emptied from tail to head, and the history values are loaded back into their corresponding registers. The program then may be restarted by reissuing the instruction which caused the exception condition and all subsequent instructions. A major disadvantage of this scheme is the cancellation of the instructions in the pipeline register at the time the exception condition is detected. The canceled instructions must be re-executed when the system restarts even though they could have successfully completed at the time the exception condition was detected.

SUMMARY OF THE INVENTION

The present invention is directed to an apparatus for implementing interrupts in pipelined processors which allows instructions to complete out of sequence and, when an exception condition is detected, allows concurrently executing instructions to complete as well.

In one embodiment of the present invention which may be used in a system which executes instructions having the format A OP B=B, a floating point register includes a plurality of addressable storage elements for storing operand data. A first address receiving circuit receives the B operand address from a first instruction, and a second address receiving circuit receives the A operand address from the first instruction. The A and B operand addresses are each used for addressing one of the plurality of floating point register storage elements. A floating point register output circuit outputs the operand data addressed by the A and B operand addresses.

An instruction executing circuit performs a function designated by the first instruction on the operand data output from the floating point register and generates result data. The instruction executing circuit includes an exception circuit for generating exception data indicating whether an exception occurred when the function was performed.

A shift register has a plurality of storage elements for storing address and control information. A first address storing circuit stores the B operand address in a selected one of the plurality of shift register storage elements, and a shift register output circuit outputs the stored first instruction B operand address at approximately the time the result data corresponding to the first instruction is generated by the instruction executing circuit. Issuance of a second instruction is inhibited when either the A operand address or the B operand address of a second instruction matches the B operand address stored in the shift register, since a true dependency on the first instruction exists in that situation.

The floating point register also includes an address receiving circuit for receiving the stored B operand address output by the shift register output circuit. A floating point register storage control circuit stores the result data corresponding to the first instruction in the floating point register storage element addressed by the stored first instruction B operand address as long as no exception occurred when the function was performed. However, the floating point register storage control circuit inhibits the storage of the result data in the floating point register when an exception does occur so that the old B operand value is not destroyed by a probably erroneous value.

An operand queue includes a plurality of storage elements for storing operand data. A fourth address receiving circuit receives a write address for the operand queue, and a fifth address receiving circuit receives a read address for the operand queue. The write and read addresses are each used for addressing one of the plurality of operand queue storage elements. An operand queue data storing circuit stores the A operand data output from the floating point register into the operand queue storage element addressed by the write address, and an operand queue output circuit outputs the stored A operand data addressed by the read address.

A trap queue includes a plurality of storage elements for storing A operand data corresponding to an instruction which generated exception data. A sixth address receiving circuit receives a write address for the trap queue, and a seventh address receiving circuit receives a read address for the trap queue. The write and read addresses are each used for addressing one of the plurality of trap queue storage elements. A trap queue data storing circuit stores the A operand data output from the operand queue into the trap queue storage element addressed by the write address whenever an exception is detected, and a trap queue output circuit outputs the data addressed by the read address.

Since writes to the floating point register are inhibited whenever an exception is detected, the original value of the B operand of the corresponding instruction is still valid. Furthermore, the original value of the A operand is stored in the operand queue. When an exception condition is detected, the A operand stored in the operand queue is transferred to the trap queue. Instruction issuing stops, the remaining instructions in the pipeline continue executing, and further exceptions are handled in the same way. After the pipeline clears, the original values of the A and B operands for the trapped instructions are stored in the trap queue and floating point register respectively. The trapped instructions may be reexecuted (or simulated) using the saved values to update the process state to correspond to the sequential architectural model. Thereafter, the process may be restarted from the program instruction that was about to issue at the time the exception was detected, instead of from the instruction that generated the first exception.

DETAILED DESCRIPTION OF THE PREFERRED EMBODIMENTS

Figure 1:
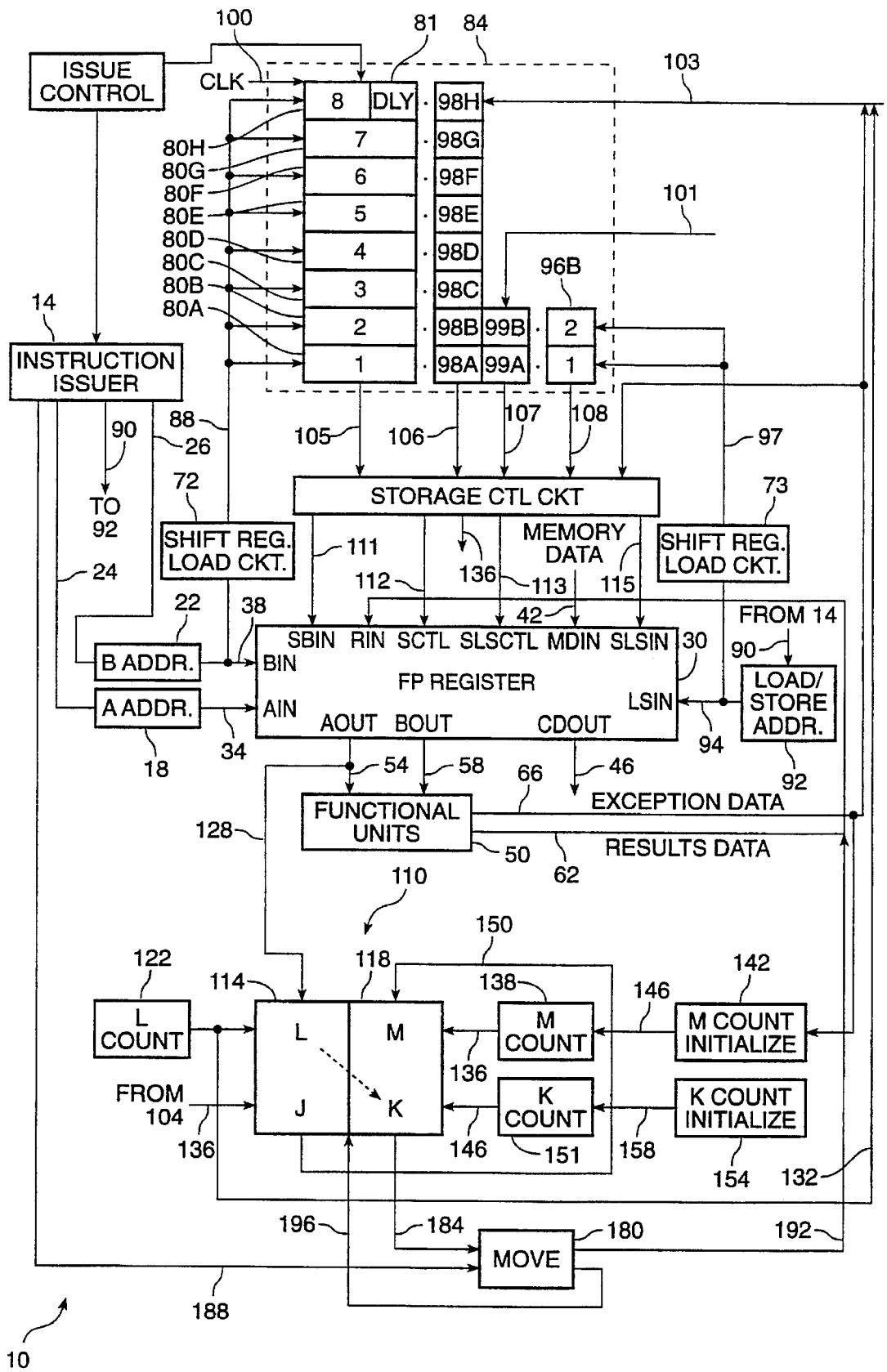
FIG. 1 is a conceptual block diagram of a particular embodiment of an apparatus according to the present invention for implementing interrupts in pipelined processors.

FIG. 1 is a conceptual block diagram of an apparatus 10 for implementing interrupts in a pipelined computing system. Computing system 10 includes an instruction issuer 14 which issues instructions in the format A op B=B. Instruction issuer 14 provides the A and B operand addresses to an A address register 18 and to a B address register 22 through communication paths 24 and 26, respectively. The A and B operand addresses are supplied to AIN and BIN terminals of a floating point register 30 through communication paths 34 and 38, respectively. Instruction issuer 14 also issues load/ store instructions, and a load/store address is communicated to a load/store address register 92 through a communication path 90. The load/store address is, in turn, communicated to a LSIN terminal of floating point register 30 through a communication path 94.

Floating point register 30 may comprise, e.g., a stack of general purpose registers which are loaded with memory data (such as from a cache memory) from a communication path 42 and which communicates the data to other data processing elements through a communication path 46. The operands addressed by the A and B operand addresses are communicated to a plurality of functional units represented by a single element 50 through communication paths 54 and 58, respectively. Functional units 50 perform functions on the A and B operands and communicate result data to a RIN terminal of floating point register 30 through a communication path 62. The functional units 50 also communicate exception data on a communication path 66 whenever an exception (trap) occurs while the function is being performed.

A shift register load circuit 72 is coupled to communication path 38 for communicating the B operand address stored in B address register 22 to one of a plurality of shift register stages 80A–H of a shift register 84 through a communication path 88. Shift register stage 80H has a delay element 81 associated with it for reasons discussed below. Each shift register stage 80A–H has a control shift register stage 98A–H associated with it that is loaded with control information (including the exception data communicated through communication path 66) through a communication path 103 for reasons discussed below.

A shift register load circuit 73 is coupled to communication path 94 for communicating the load/store address stored in load/store address register 92 to one of a plurality of shift register stages 96A–B of shift register 84 through a communication path 97. Each shift register stage 96A–B has a control shift register stage 99A–B associated with it that is loaded with control information through a communication path 101 for reasons discussed below.

Clock signals are supplied to shift register 84 through a clock signal line 100. Shift register stages 80A–H, 6A–B, 98A–H and 99A–B shift the data stored therein one shift register stage per clock signal for reasons discussed below.

Shift register stages 80A, 98A, 99A, and 96A communicate the data stored therein to a storage control circuit 104 through respective communication paths 105, 106, 107, and 108. Storage control circuit 104 in turn communicates the data stored in shift register stages 80A, 98A, 99A and 96A to SBIN, SCTL, SLSCTL, and SLSIN terminals of floating point register 30 through respective communication paths 111, 112, 113 and 115.

Apparatus 10 also includes a trap register 110 which comprises an operand queue 114 and a trap queue 118. Operand queue 114 comprises a plurality of storage elements for storing A operand values received through a communication path 128 coupled to communication path 54. If desired, the program counter value corresponding to the originating instruction may be stored with the A operand value in operand queue 114, or else it may be stored separately in the CPU. An L counter 122 generates count values that are used as write addresses for operand queue 114, and the addresses are communicated to operand queue 114 through a communication path 124 and to shift register stages 98A–H through a communication path 132. When the stored write addresses are shifted into shift register stage 98A, they are communicated back to operand queue 114 through a communication path 136 from storage control circuit 104. The addresses on communication path 136 function as read addresses for operand queue 114.

Operands (and optional program counter values) read from operand queue 114 are communicated to trap queue 118 through a communication path 150. An M counter 138 generates count values that are used as write addresses for trap queue 118, and the addresses are communicated to trap queue 118 through a communication path 136. M counter 138 is coupled to an M count initialize circuit 142 through a communication path 146. M count initialize circuit 142 is, in turn, coupled to communication path 66 and initializes M counter 138 upon the first occurrence of an exception condition. A K counter 151 generates count values that are used as read addresses for trap queue 118, and the addresses are communicated to trap queue 118 through a communication path 146. K counter 151 is coupled to a K count initialize circuit 154 through a communication path 158.

Operands read from trap queue 118 are communicated to a special function circuit 180 through a communication path 184. Special function circuit 180 is controlled by signals received from instruction issuer 14 through a communication path 188 and provides the stored operands to communication path 62 through a communication path 192. Special function circuit 180 also provides control signals to trap register 110 through a communication path 196.

Special function circuit 180 may be used instead of functional units 50 for simple instructions such as MOVE instructions which typically involve only one source operand (e.g., the A operand) and which do not generate exception conditions. In operation, instruction issuer 14 provides a signal on communication path 188 to inform special function circuit 180 that functional units 50 are to be bypassed. In response, special function circuit 180 provides a signal on communication path 196 to trap register 110 to cause the A operand stored in operand queue 114 at the address indicated by the value of L counter 122 to be immediately transferred to trap queue 118 at the address indicated by the value of K counter 151. From there the operand is communicated to special function circuit 180 wherein the desired operation is performed on the operand. The result (if any) is then communicated to the RIN terminal of floating point register 30 through communication paths 192 and 62.

The general operation of apparatus 10 is as follows. Instruction issuer 14 issues an instruction in part by supplying an A operand address to A address register 18 and a B operand address to B address register 22 through communication paths 24 and 26, respectively. The A and B operand addresses are then communicated to floating point register 30 for addressing operands stored therein. The addressed operands are communicated to functional units 50 through communication paths 54 and 58. At the same time, shift register load circuit 72 stores the B operand address in one of shift register stages 80A–H so that the B operand address is shifted into shift register stage 80A at approximately the time the result data for the corresponding instruction is provided on communication path 62 by functional units 50. For example, the B operand address corresponding to an instruction which takes three clock cycles to complete is stored in shift register stage 80C.

In this embodiment, all instructions except a floating point divide instruction may be executed in seven clock cycles or less. The floating point divide instruction takes, e.g., 30 clock cycles to execute. Rather than make shift register 84 thirty stages long, the B operand address for the floating point divide instruction is stored in shift register stage 80H and maintained there by delay element 81 until seven clock cycles remain in the execution cycle. Thereafter, the B operand address is shifted into shift register stage 80G, and shifting proceeds as with the other B operand addresses.

If the instruction was a load/store instruction, then the load/store address is placed in load/store address register 92 and thereafter communicated to floating point register 30 and to shift register stages 96A–B. In this embodiment, the load/store instruction takes two clock cycles to execute, so the load/store address is placed in shift register stage 96B.

When the A operand appears on communication path 54, it is also communicated to operand queue 114 where it is stored in the location specified by the value generated by L counter 122 (together with the corresponding program counter value, if desired). The L counter value is also communicated to shift register stages 98A–H and stored in the shift register stage corresponding to the shift register stage 80A–H which contains the B operand address. Thus, if the B operand address was stored in shift register stage 80E, then the L counter value is stored in shift register stage 98E.

The B operand address of the instruction together with its corresponding control information is shifted one shift register stage per clock cycle until they are shifted into shift register stages 80A and 98A. At that time, storage control circuit 104 evaluates the control information and communicates the B operand address to the SBIN terminal of floating point register 30. Additionally, the result data for the first instruction should be communicated to the RIN terminal of floating point register via communication path 62. A signal is then provided on communication path 112 to the SCTL terminal of floating point register 30 for storing the result data at the location addressed by the B operand address on communication path 111.

If an exception occurred while the function was being performed on the operand data, exception data appears on communication path 66 and is communicated to storage control circuit 104 and to the shift register stage corresponding to the B operand address of the instruction. When the exception data is shifted into shift register stage 98A, storage control circuit 104 issues a signal on communication path 112 to SCTL terminal of floating point register 30 for inhibiting the storing of the result data in floating point register 30. Additionally, the operand queue address stored in shift register stage 98A is communicated via communication path 136 to operand queue 114 for addressing the A operand corresponding to the instruction which generated the exception. The addressed A operand (and optional program counter value) is communicated to trap queue 118 through communication path 150 wherein it is stored at the address generated by M counter 138. If this is the first time an exception is generated, then M count initialize circuit 142 initializes M counter 138 before the A operand is stored in trap queue 118. Otherwise the M counter is incremented before the A operand is stored in trap queue 118.

If a load/store instruction was issued, then the load/store address of the instruction together with its corresponding control information is shifted one shift register stage per clock cycle until they are shifted into shift register stages 98A and 99A. At that time, storage control circuit 104 evaluates the control information and communicates the load/store address through communication path 115 to the SLSIN terminal of floating point register 30. If a load operation was specified, the memory data should be communicated to the MDIN terminal of floating point register 30 via communication path 42. A signal is then provided on communication path 113 to the SLSCTL terminal of floating point register 30 for storing the memory data at the location addressed by the load/store address on communication path 113. If a store operation was specified, a signal is then provided on communication path 113 to the SLSCTL terminal of floating point register 30 for providing the addressed memory data on communication path 46.

Load/store instructions typically do not require saving the old value designated. That is why they are allowed to execute concurrently with instructions that use functional units 50. However, if for some reason a load/store instruction is to be aborted, control information to that effect is stored in shift register stage 99A or 99B through communication path 101. When the control information is shifted into shift register stage 99A, storage control circuit 104 issues a signal on communication path 113 to the LSCTL terminal of floating point register 30 for inhibiting the load/store operation.

Unlike known devices for implementing interrupts in pipelined processors, instructions which have already issued are allowed to continue executing despite the occurrence of an exception condition in a previous instruction. If the instructions which follow a trapped instruction complete without themselves generating an exception condition, then the result data is stored as in the normal case. If other instructions generate exception conditions, then the storage of their result data is inhibited, and the associated A operand stored in operand queue 114 is transferred to trap queue 118 at the address provided by M counter 138 (which is incremented upon each exception condition). After shift register 84 empties, K count initialize circuit 154 initializes K counter 146, and the stored A operands are read from trap register 118, communicated through communication paths 184 and 192 to the RIN terminal of floating point register 30, and restored therein. The instructions which caused the exception conditions then may be reexecuted using the program counter value saved in either trap register 118 or the CPU or simulated with the appropriate software to update floating point register 30 to correspond with a sequential architectural model.

While the above is a complete description of a preferred embodiment of the present invention, various modifications may be employed. For example, the apparatus could be used with an instruction issuer that issues instructions in the format A op B=C by adding another trap register for storing the B operand values. Consequently, the scope of the invention should not be limited except as described in the claims.

What is claimed is:

1. An apparatus for processing instructions in a computing system comprising:

a first memory including:

a first plurality of addressable memory storage elements;

a first operand address receiving circuit coupled to the first plurality of addressable memory storage elements for receiving a first operand address associated with a first instruction;

a second operand address receiving circuit coupled to the first plurality of addressable memory storage elements for receiving a second operand address associated with the first instruction;

a third operand address receiving circuit coupled to the first plurality of addressable memory storage elements for receiving a third operand address;

a first memory output circuit coupled to the first plurality of addressable memory storage elements for outputting a first operand in response to the first operand address and for outputting a second operand in response to the second operand address;

an instruction executing circuit coupled to the first memory output circuit for performing a function on the first operand and the second operand and to the first plurality of addressable memory storage elements and for generating a result data;

a second memory including:

a second plurality of addressable memory storage elements;

a first operand address storage circuit coupled to the first operand address receiving circuit and to the second plurality of addressable memory storage elements, for storing the first operand address in one of the second plurality of addressable memory storage elements;

a second memory output circuit coupled to the second plurality of addressable memory storage elements and to the third operand address receiving circuit, for outputting the first operand address to the third operand address receiving circuit as a third operand address;
Page 3 a first memory control circuit coupled to the first plurality of addressable memory elements for selectively storing the result data in an addressable memory storage element from the first plurality of addressable memory storage elements in response to the third operand address; and a third memory including:

a third plurality of addressable memory storage elements;

a fourth operand address receiving circuit coupled to the third plurality of addressable memory storage elements for receiving a fourth operand address; and a first operand storage circuit coupled to the first memory output circuit and to the third plurality of addressable memory storage elements for storing the first operand in an addressable memory storage element from the third plurality of addressable memory storage elements in response to the fourth operand address.

2. The apparatus of claim 1 wherein the instruction executing circuit includes an exception circuit for generating an exception data indicating whether an exception occurred when the function is performed; and wherein the first memory control circuit includes an inhibit circuit coupled to the exception circuit for inhibiting the storage of the result data in the first plurality of addressable memory storage elements when the exception data indicates an exception occurred when the function is performed.

3. The apparatus of claim 2, further comprising:

an instruction issuing circuit coupled to the first operand address receiving circuit and to the second operand address receiving circuit for issuing a plurality of instructions by communicating a first operand address of each of the plurality of instructions to the first operand address receiving circuit and by communicating a second operand address of each of the plurality of instructions to the second operand address receiving circuit.

4. The apparatus of claim 3 further comprising:

an issue control circuit coupled to the instruction issuing circuit and to the second memory, for inhibiting issuance of a second instruction when a first operand address of the second instruction matches the first operand address stored in the second memory.

5. The apparatus of claim 1, wherein the instruction executing circuit includes an exception circuit for generating exception data indicating whether an exception occurred when the function is performed.

6. The apparatus according of claim 5, further comprising:

an exception data storing circuit coupled to the second memory and to the exception circuit for storing the exception data in an element of the second plurality of addressable memory storage elements corresponding to the addressable memory storage element so that the exception data is output by the second memory output circuit at a time approximately equal to a time the third operand address is output by the second memory output circuit.

7. The apparatus of claim 5, wherein the third memory further comprises:

a fifth operand address receiving circuit coupled to the third plurality of addressable memory storage elements for receiving a fifth operand address; and a third memory output circuit coupled to the third plurality of addressable memory storage elements for outputting a third operand in response to the fifth operand address.

8. The apparatus of claim 7 further comprising:

a fourth memory including:

a fourth plurality of addressable memory storage elements;

a sixth operand address receiving circuit coupled to the fourth plurality of addressable memory storage elements for receiving a sixth operand address; and a second operand storage circuit coupled to the third memory output circuit and to the fourth plurality of addressable memory storage elements for storing the third operand in an addressable memory storage element from the fourth plurality of addressable memory storage elements in response to the sixth operand address.

9. The apparatus of claim 8, wherein the fourth memory further comprises:

a seventh operand address receiving circuit coupled to the fourth plurality of addressable memory storage elements for receiving a seventh operand address; and a fourth memory output circuit coupled to the fourth plurality of addressable memory storage elements for outputting a fourth operand in response to the seventh operand address.

10. The apparatus of claim 9, further comprising:

a bypass circuit coupled to the third memory and to the fourth memory, for communicating an operand stored in one of the third plurality of memory storage elements addressed by the fourth operand address directly to one of the fourth plurality of memory storage elements addressed by the seventh operand address.

11. The apparatus of claim 8, wherein the second operand storage circuit is coupled to the exception circuit for storing an operand stored one of the third plurality of memory storage elements addressed by the fifth operand address into one of the fourth plurality of memory storage elements addressed by the sixth operand address when the exception data indicates an exception occurred when the function is performed.

12. The apparatus of claim 11, wherein the first memory control circuit includes an inhibit circuit coupled to the exception circuit for inhibiting the storage of the result data in the first plurality of addressable memory storage elements when the exception data indicates an exception occurred when the function is performed.

13. The apparatus of claim 12, further comprising:

an instruction issuing circuit coupled to the first operand address receiving circuit and to the second operand address receiving circuit for issuing a plurality of instructions by communicating a first operand address of each of a plurality of instruction to the first operand address receiving circuit and by communicating a second operand address of each of the plurality of instructions to the second operand address receiving circuit.

14. The apparatus of claim 13, further comprising:

an issue control circuit coupled to the instruction issuing circuit and to the second memory, for inhibiting issuance of a second instruction when a first operand address of the second instruction matches the first operand address stored in the second memory.

15. The apparatus of claim 11, wherein the first memory control circuit further includes a third operand storage circuit coupled to the second memory and to the third memory output circuit for storing the third operand in an element of the second plurality of storage elements corresponding to the addressable memory storage element so that the third operand is output by the second memory output circuit at a time approximately equal to a time the third operand address is output by the second memory output circuit.

16. The apparatus of claim 15, wherein the fifth operand address receiving circuit is coupled to the second memory output circuit for receiving the third operand address stored therein, the third operand address comprising the fifth address when the exception data indicates an exception occurred when the function is performed.

17. The apparatus of claim 16, wherein the first memory control circuit includes inhibit circuit coupled to the first memory and to the exception circuit for inhibiting the storage of the result data in one of the first memory storage elements addressed by the third operand address when the exception data indicates an exception occurred when the function is performed.

18. The apparatus of claim 17, further comprising:

an exception data storing circuit coupled to the second memory and to the exception circuit for storing the exception data in an element of the second plurality of addressable memory storage elements corresponding to the addressable memory storage element so that the exception data is output by the second memory output circuit at a time approximately equal to a time the third operand address is output by the second memory output circuit.

19. The apparatus of claim 17, further comprising:

an instruction issuing circuit coupled to the first operand address receiving circuit and to the second operand address receiving circuit for issuing a plurality of instructions by communicating a first operand address of each of the plurality of instructions to the first operand address receiving circuit and by communicating a second operand address of each of the plurality of instructions to the second operand address receiving circuit.

20. The apparatus of claim 19, further comprising:

an issue control circuit coupled to the instruction issuing circuit and to the second memory, for inhibiting issuance of a second instruction when a first operand address of the second instruction matches the first operand address stored in the second memory.

21. The apparatus of claim 17, wherein the fourth memory further comprises:

a seventh operand address receiving circuit coupled to the fourth plurality of addressable memory storage elements for receiving a seventh operand address; and a fourth memory output circuit coupled to the fourth plurality of addressable memory storage elements for outputting a fourth operand in response to the seventh operand address.

22. The apparatus of claim 21, further comprising:

a bypass circuit coupled to the third memory and to the fourth memory, for communicating an operand stored in one of the third plurality of memory storage elements addressed by the fourth operand address directly to one of the fourth plurality of memory storage elements addressed by the seventh operand address.

23. The apparatus of claim 22, further comprising:

an instruction issuing circuit coupled to the first operand address receiving circuit and to the second operand address receiving circuit for issuing a plurality of instructions by communicating a first operand address of each of the plurality of instructions to the first operand address receiving circuit.

24. The apparatus of claim 23, further comprising:

an issue control circuit coupled to the instruction issuing circuit and to the second memory, for inhibiting issuance of a second instruction when a first operand address of the second instruction matches the first operand address stored in the second memory.

25. The apparatus of claim 24, further comprising:

an exception data storing circuit coupled to the second memory and to the exception circuit for storing the exception data in an element of the second plurality of addressable memory storage elements corresponding to the addressable memory storage element so that the exception data is output by the second memory output circuit at a time approximately equal to a time the third operand address is output by the second memory output circuit.

* * * * *